(12) United States Patent
Liu et al.

(10) Patent No.: US 6,916,510 B1
(45) Date of Patent: Jul. 12, 2005

(54) METHOD FOR IMPROVING EFFICIENCY OF UV CURING OF LUBRICANT THIN FILMS AND IMPROVED DATA/INFORMATION STORAGE MEDIA OBTAINED THEREBY

(75) Inventors: Jianwei Liu, Fremont, CA (US); Li-Ping Wang, Fremont, CA (US); Michael Joseph Stirniman, Fremont, CA (US); Jing Gui, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 48 days.

(21) Appl. No.: 10/246,463

(22) Filed: Sep. 19, 2002

Related U.S. Application Data

(60) Provisional application No. 60/381,430, filed on May 17, 2002.

(51) Int. Cl.$^7$ .............................................. G11B 5/725
(52) U.S. Cl. ...................... 427/553; 427/558; 427/508; 427/130; 428/694 TF
(58) Field of Search ............................... 427/553, 558, 427/508, 130; 428/694 TF

(56) References Cited

U.S. PATENT DOCUMENTS

| | | | |
|---|---|---|---|
| 4,707,392 A | * | 11/1987 | Kato et al. ................. 428/65.4 |
| 5,030,478 A | | 7/1991 | Lin et al. |
| 5,273,830 A | | 12/1993 | Yaguchi et al. |
| 5,578,355 A | * | 11/1996 | Hirata et al. ............... 428/64.3 |
| 5,587,217 A | | 12/1996 | Chao et al. |
| 6,043,194 A | | 3/2000 | Saito et al. |
| 6,096,385 A | | 8/2000 | Yong et al. |
| 6,099,762 A | | 8/2000 | Lewis |
| 6,224,949 B1 | * | 5/2001 | Wright et al. ............... 427/508 |

OTHER PUBLICATIONS

Vurens et al, "The Mechanism of Ultraviolet Bonding of Perfluorpolyether Lubricants", Jan. 1, 1993, IEEE Transactions on Magnetics Vil 29, No. 1, pp 283–285.*

* cited by examiner

*Primary Examiner*—Stevan A. Resan
(74) *Attorney, Agent, or Firm*—McDermott Will & Emery LLP

(57) ABSTRACT

Disclosed is a method of increasing the efficiency of ultraviolet (UV) curing of a lubricant thin film utilized as a topcoat layer of a data/information storage medium, comprising irradiating the lubricant thin film with UV radiation of a wavelength corresponding to a wavelength of maximum absorption of UV radiation by the lubricant thin film. Also disclosed are data/information storage media, e.g., magnetic or MO disks, comprising the UV-cured lubricant thin films as topcoat layers.

10 Claims, 1 Drawing Sheet

METHOD FOR IMPROVING EFFICIENCY OF UV CURING OF LUBRICANT THIN FILMS AND IMPROVED DATA/ INFORMATION STORAGE MEDIA OBTAINED THEREBY

CROSS-REFERENCE TO PROVISIONAL APPLICATION

This application claims priority from U.S. provisional patent application Ser. No. 60/381,430 filed May 17, 2002, the entire disclosure of which is incorporated herein by reference.

FIELD OF THE INVENTION

The present invention relates to an improved method for increasing or enhancing the performance, e.g., durability, corrosion resistance and tribology, of a thin lubricant film on the surface of a thin film recording medium, particularly when the latter is utilized in combination with a flying head read/write transducer in Contact Start/Stop ("CSS") operation, and to improved thin film recording media obtained thereby. The invention finds particular utility in the manufacture and use of thin film type magnetic or magneto-optical ("MO") data/information storage and retrieval media comprising a stacked plurality of thin film layers formed on a suitable substrate, e.g., a disk-shaped substrate, wherein a thin topcoat layer comprised of the lubricant material is applied to a protective overcoat layer forming the upper surface of the layer stack for improving tribological performance of the media when utilized with read/write transducer heads operating at very low flying heights.

BACKGROUND OF THE INVENTION

Magnetic and MO media are widely employed in various applications, particularly in the computer industry for data/information storage and retrieval purposes. A magnetic medium in, e.g., disc form, such as utilized in computer-related applications, comprises a non-magnetic, disk-shaped substrate, e.g., of glass, ceramic, glass-ceramic composite, polymer, metal, or metal alloy, typically an aluminum (Al)-based alloy such as aluminum-magnesium (Al—Mg), having at least one major surface on which a layer stack or laminate comprising a plurality of thin film layers constituting the medium are sequentially deposited. Such layers may include, in sequence from the substrate deposition surface, a plating layer, e.g., of amorphous nickel-phosphorus (Ni—P), a polycrystalline underlayer, typically of chromium (Cr) or a Cr-based alloy such as chromium-vanadium (Cr—V), a magnetic layer, e.g., of a cobalt (Co)-based alloy, and a protective overcoat layer, typically of a carbon (C)-based material, e.g., diamond-like carbon ("DLC") having good tribological properties. A similar situation exists with MO media, wherein a layer stack or laminate is formed on a substrate deposition surface, which layer stack or laminate typically comprises a reflective layer, e.g., of a metal or metal alloy, one or more rare-earth thermo-magnetic (RE-TM) alloy layers, one or more transparent dielectric layers, and a protective overcoat layer, e.g., a DLC layer, for functioning as reflective, transparent, writing, writing assist, and read-out layers, etc.

Thin film magnetic and MO media in disk form, such as described supra, are typically lubricated with a thin topcoat film or layer comprised of a polymeric lubricant, e.g., a perfluoropolyether, to reduce wear of the disc when utilized with data/information recording and read-out transducer heads operating at low flying heights, as in a hard disk system functioning in a contact Start/Stop ("CSS") mode. Conventionally, the thin film of lubricant is applied to the disc surface(s) during manufacture by dipping into a bath containing a small amount of lubricant, e.g., less than about 1% by weight of a fluorine-containing polymer, dissolved in a suitable solvent, typically a perfluorocarbon, fluorohydrocarbon, or hydrofluoroether.

Thin film magnetic recording media are conventionally employed in disk form for use with disk drives for storing large amounts of data in magnetizable form. Typically, one or more disks are rotated on a central axis in combination with data transducer heads. In operation, a typical contact start/stop ("CSS") cycle commences when the head begins to slide against the surface of the disk as the disk begins to rotate. Upon reaching a predetermined high rotational speed, the head floats in air at a predetermined distance from the surface of the disk due to dynamic pressure effects caused by the air flow generated between the sliding surface of the head and the disk. During reading and recording operations, the transducer head is maintained at a controlled distance from the recording surface, supported on a bearing of air as the disk rotates, such that the head can be freely moved in both the circumferential and radial directions, allowing data to be recorded on and retrieved from the disk at a desired position. Upon terminating operation of the disk drive, the rotational speed of the disk decreases and the head again begins to slide against the surface of the disk and eventually stops in contact with and pressing against the disk. Thus, the transducer head contacts the recording surface whenever the disk is stationary, accelerated from the static position, and during deceleration just prior to completely stopping. Each time the head and disk assembly is driven, the sliding surface of the head repeats the cyclic sequence consisting of stopping, sliding against the surface of the disk, floating in air, sliding against the surface of the disk, and stopping.

It is considered desirable during reading and recording operations, and for obtainment of high areal recording densities, to maintain the transducer head(s) as close to the associated recording surface(s) as is possible, i.e., to minimize the "flying height" of the head(s). Thus a smooth recording surface is preferred, as well as a smooth opposing surface of the associated transducer head, thereby permitting the head and the disk surface to be positioned in close proximity, with an attendant increase in predictability and consistent behavior of the air bearing supporting the head during motion.

The lubricity properties of disk-shaped recording media are generally measured and characterized in terms of dynamic and/or static coefficients of friction. The former type, i.e., dynamic friction coefficient, is typically measured utilizing a standard drag test in which the drag produced by contact of a read/write transducer head with a disk surface is determined at a constant spin rate, e.g., 1 rpm. The latter type, i.e., static coefficients of friction (also known as "stiction" values), are typically measured utilizing a standard contact start/stop ("CSS") test in which the peak level of friction is measured as the disk starts rotating from zero (0) rpm to a selected revolution rate, e.g., 5,000 rpm. After the peak friction has been measured, the disk is brought to rest, and the start/stop process is repeated for a selected number of start/stop cycles. An important property of a disk which is required for good long-term disk and drive performance is that the disk retain a relatively low coefficient of friction after many start/stop cycles or contacts with the read/write transducer head, e.g., 20,000 start/stop cycles.

The most commonly employed lubricants utilized with thin film, disk-shaped magnetic and MO media, i.e., perfluoropolyether ("PFPE")-based lubricants, perform well under ambient conditions but not under conditions of higher temperature and high or low humidity. Studies, as described in, for example U.S. Pat. No. 5,587,217, the entire disclosure of which is incorporated herein by reference, have indicated that the tribological properties, and perhaps corrosion resistance, of perfluoropolyether-based lubricants utilized in the manufacture of thin film recording media can be substantially improved by addition thereto of an appropriate amount of a cyclotriphosphazene-based lubricant additive, e.g., a polyphenoxy cyclotriphosphazene comprising substituted or unsubstituted phenoxy groups, to form what is termed a "composite lubricant".

Currently, bis (4-fluorophenoxy)-tetrakis (3-trifluoromethyl phenoxy) cyclotriphospazene (available as X-1P™ from Dow Chemical Co., Midland, Mich.) is the additive most commonly utilized with perfluoropolyether-based lubricants for forming composite lubricants for use with thin film magnetic and MO media. However, as disclosed in U.S. Pat. Nos. 5,718,942 and 5,908,817, the disclosures of which are incorporated herein by reference, the use of X-1P as a lubricant additive for forming composite lubricants comprising the perfluoropolyether-based lubricants commonly employed in the data storage industry (e.g., Fomblin Z-DOL™ and Fomblin Z-TETRAOL™, each available from Ausimont, Thorofare, N.J.) incurs a disadvantage in that the former (i.e., the cyclotriphosphazene-based lubricant additive) has very low solubility in the latter (i.e., the PFPE-based primary lubricant).

For example, X-1P, in combination with Z-DOL at levels up to about 5 wt. %, reduces stiction and increases the stability of Z-DOL. However, because X-1P is virtually immiscible in PFPE-based lubricants, phase separation typically occurs at the optimal X-1P/PFPE ratios. The phase separation leads to chemical non-uniformity of the lubricant film on the media (e.g., disk) surface, as by the so-called "balling" effect, which tends to affect the tribology (i.e., durability) of the head/disk interface, particularly when the thickness of the X-1P exceeds about 1–2 Å. As a consequence of the poor compatibility of the X1P lubricant additive with the Z-DOL or Z-TETRAOL primary lubricant, the maximum amount of X-1P that can be used therewith is limited by the PFPE type and carbon type of the protective overcoat layer. Thus, according to current practice, the effective concentration window for use of X-1P in combination with PFPE is quite narrow, and special process control is required to achieve optimal performance. Notwithstanding such special process control, phase separation of the X-1P additive, accelerated lubricant loss, and a large amount of transducer head smear frequently occur even with such low additive contents.

U.S. Pat. No. 6,099,762, the entire disclosure of which is incorporated herein by reference, discloses a process for enhancing the bonding, thus durability, of thin lubricant layers comprised of a PFPE, a phosphazene, or both, to media surfaces by means of a process comprising exposing the lubricant layer or film to infra-red ("IR") and ultra-violet ("UV") radiation, either simultaneously or sequentially, wherein the IR radiation effects heating of the lubricant layer or film to a temperature above about 150° F. but less than about 500° F., and the UV radiation comprises a wavelength component of about 185 nm for photolytically generating ozone ($O_3$) in the vicinity of the lubricant layer or film for effecting bonding thereof to the media surface. This process for enhancing bonding of the composite lubricant films to the media surface, however, is not performed in a manner as to effect optimal stabilization of the composite lubricant films and enhancement of their durability when utilized in CSS-type operation.

Co-pending U.S. Pat. No. 6,686,019 filed Nov. 13, 2001 and application Ser. No. 10/106,486 filed Mar. 27, 2002, each assigned to the assignee of this application, disclose methods for treating thin films or layers of composite lubricant, such as Z-DOL PFPE/X-1P composite lubricants, solely with UV radiation for effecting curing thereof for, inter alia, stabilization against phase separation and improved tribological performance. However, inasmuch as the efficiency of the UV curing process affects product throughput in automated manufacturing of data/information storage and retrieval media, e.g., magnetic and/or MO disks, it is considered important to minimize the UV irradiation dosage while maintaining the improved performance characteristics afforded by the UV curing process.

In view of the above, there exists a clear need for improved methodology for forming thin films of lubricants, such as, for example, composite lubricant materials, on surfaces of thin film recording media, e.g., in disk form, which methodology overcomes the drawbacks and disadvantages described above, particularly with respect to efficiency of the UV curing process. More specifically, there exists a need for improved methodology for applying and treating lubricant thin films utilized in the manufacture of thin film magnetic and/or MO recording media, e.g., lubricant materials comprised of a primary lubricant and a lubricant additive for enhancement of the stability, durability, and tribological properties of media which operate under CSS conditions.

The present invention addresses and solves problems and difficulties in efficiently performing UV irradiation processing for achieving stabilized, high performance, high durability lubricant thin films in the manufacture of thin film, disk-shaped magnetic and MO data/information storage and retrieval media for operation under CSS conditions, for example, wherein the lubricant thin films are comprised of a primary lubricant and a lubricant additive, while maintaining fill compatibility with all aspects of conventional automated manufacturing technology therefor, including productivity requirements necessary for economic competitiveness. In addition, the present invention provides improved thin film magnetic and MO media having stabilized, high durability lubricant films, e.g., composite lubricant thin films comprised of a primary lubricant and a lubricant additive. Further, the methodology afforded by the present invention enjoys diverse utility in the manufacture of various other devices and/or articles requiring formation of stable, high performance lubricant thin films thereon.

DISCLOSURE OF THE INVENTION

An advantage of the present invention is an improved method for increasing the efficiency of curing of a lubricant thin film by means of UV irradiation.

Another advantage of the present invention is an improved method for increasing the efficiency of UV curing of composite lubricant thin films utilized as topcoat layers of data/information storage and retrieval media.

Yet another advantage of the present invention is an improved method of manufacturing a data/information storage and retrieval medium comprising a UV-cured thin lubricant topcoat layer.

Still another advantage of the present invention is an improved data/information storage and retrieval medium comprising a UV-cured thin lubricant topcoat layer.

Additional advantages and other aspects and features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to an aspect of the present invention, the foregoing and other advantages are obtained in part by a method of increasing the efficiency of curing of a lubricant thin film by means of ultra-violet (UV) irradiation, comprising irradiating the lubricant thin film with UV radiation of a wavelength corresponding to a wavelength of maximum absorption of UV radiation by the lubricant thin film.

According to embodiments of the present invention, the lubricant thin film is formed on a surface of a data/information storage and retrieval medium, e.g., a disk-shaped magnetic or magneto-optical (MO) recording medium comprising a layer stack formed on a substrate surface, the layer stack including an uppermost, carbon (C)-containing protective overcoat layer, and the lubricant thin film is in the form of a topcoat layer in overlying contact with the carbon (C)-containing protective overcoat layer.

In accordance with particular embodiments of the present invention, the lubricant thin film comprises at least one perfluoropolyether compound; e.g., the lubricant thin film comprises a composite lubricant material including at least one perfluoropolyether compound and at least one lubricant additive.

According to preferred embodiments of the invention, the at least one lubricant additive is a phosphazene derivative, e.g., bis (4-fluorophenoxy)-tetrakis (3-trifluoromethyl phenoxy) cyclo-triphosphazene.

Further embodiments of the present invention include those wherein the wavelength of maximum absorption of UV radiation by the lubricant thin film is varied by varying the temperature of the lubricant thin film during irradiation.

Another aspect of the present invention is a method of manufacturing a data/information storage and retrieval medium, comprising steps of:

(a) providing a data/information storage and retrieval medium including at least one surface;

(b) applying a thin film of a lubricant to the at least one surface of the medium; and (c) curing the thin film of lubricant by irradiating with ultra-violet (UV) radiation of a wavelength corresponding to a wavelength of maximum absorption of UV radiation by the lubricant thin film.

According to embodiments of the present invention, step (a) comprises providing a disk-shaped magnetic or magneto-optical (MO) recording medium including a layer stack formed on a substrate surface, the layer stack including an uppermost, carbon (C)-containing protective overcoat layer; and step (b) comprises applying the lubricant thin film in the form of a topcoat layer in overlying contact with the carbon (C)-containing protective overcoat layer.

In accordance with particular embodiments of the invention, step (b) comprises applying a lubricant thin film including at least one perfluoropolyether compound; whereas, according to preferred embodiments of the invention, step (b) comprises applying a composite lubricant thin film including at least one perfluoropolyether compound and at least one lubricant additive; e.g., step (b) comprises applying a composite lubricant thin film including at least one perfluoropolyether compound and at least one phosphazene derivative as the at least one lubricant additive.

According to certain preferred embodiments of the present invention, step (b) comprises applying a composite lubricant thin film including at least one perfluoropolyether compound and bis (4-fluorophenoxy)-tetrakis (3-trifluoromethyl phenoxy) cyclo-triphosphazene as the at least one lubricant additive; and step (c) comprises irradiating the composite lubricant thin film with UV radiation of 254 nm wavelength while maintaining the temperature of the composite lubricant thin film at a temperature of about 25° C.

In accordance with additional embodiments of the invention, step (c) further comprises varying the wavelength of maximum absorption of UV radiation by the lubricant thin film by varying the temperature of the lubricant thin film during irradiation.

Yet another aspect of the present invention is a data/information storage and retrieval medium, comprising:

(a) a substrate including at least one surface, a layer slack formed on the at least one surface and including an uppermost, protective overcoat layer; and (b) a UV-cured lubricant topcoat layer on the protective overcoat layer, the lubricant topcoat layer having been treated solely with UV radiation of a wavelength corresponding to a wavelength of maximum absorption of UV radiation by the lubricant thin film, the water contact angle (WCA) of the UV-cured lubricant topcoat layer being greater than about 90°.

According to embodiments of the present invention, the substrate (a) is disk-shaped and the layer stack includes at least one magnetic or magneto-optical (MO) recording layer and an uppermost, protective overcoat layer comprising a carbon (C)-based material; and the UV-cured lubricant topcoat layer (b) comprises at least one perfluoropolyether compound.

In accordance with preferred embodiments of the invention, the UV-cured lubricant topcoat layer (b) comprises the at least one perfluoropolyether compound and at least one phosphazene derivative as at least one lubricant additive; e.g., the UV-cured lubricant topcoat layer (b) comprises perfluoropolyether (PFPE) and bis (4-fluorophenoxy)-tetrakis (3-trifluoromethyl phenoxy) cyclo-triphosphazene as a lubricant additive.

Additional advantages and aspects of the present invention will become readily apparent to those skilled in the art from the following detailed description, wherein embodiments of the present invention are shown and described, simply by illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, wherein.

DESCRIPTION OF THE INVENTION

Figure 1:
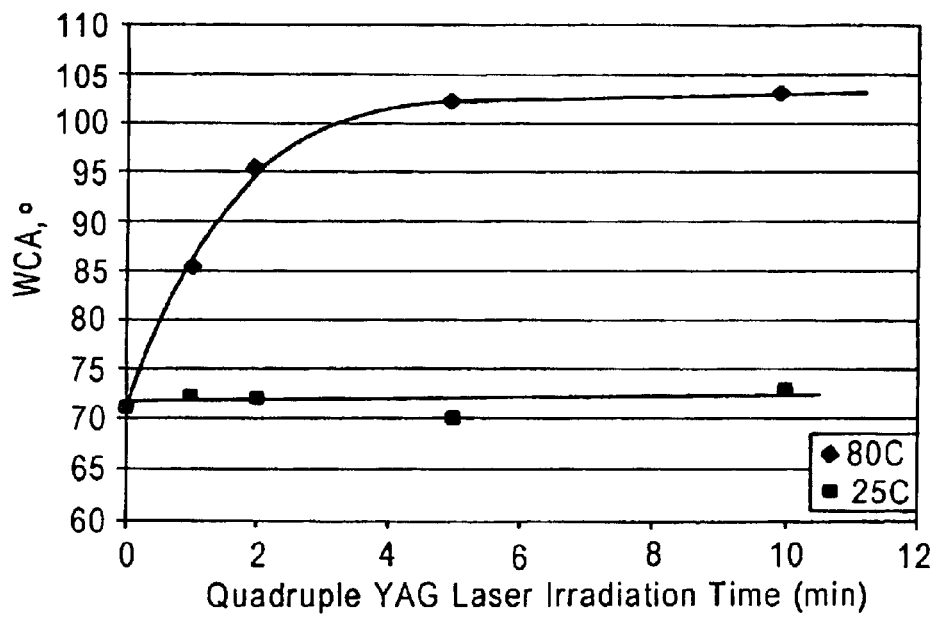
FIG. 1 is a graph for illustrating the variation of the water contact angle (WCA) of PFPE/X-1P lubricant thin films with irradiation time by a 266 nm UV laser beam at film temperatures of 25 and 80° C.

The present invention is based upon the discovery by the inventors that a significant improvement in the efficiency of performing UV curing of lubricant thin films, e.g., of derivatized perfluoropolyethers comprising functional groups or moieties, and composite lubricants such as those comprising a combination or mixture of perfluoropolyethers and functional group-containing additives, e.g., phospazenes, can be obtained by utilizing UV radiation of a wavelength corresponding to the wavelength of a UV absorption peak of the lubricant material, whereby the required UV dosage and irradiation time for curing of the lubricant thin film for improving the corrosion resistance and tribological properties thereof, are minimized. In addition, lubricant thin films formed by irradiation with wavelength-matched UV radiation according to the inventive methodology exhibit significantly higher water contact angles (WCA), indicative of reduced surface energies and increased chemical stability, relative to similar lubricant thin films cured by UV irradiation according to conventional methodology (i.e., wherein wavelength matching is not utilized). As a consequence of the improvement in UV curing efficiencies afforded by wavelength matching, the invention is readily adapted for meeting the productivity and throughput requirements of automated manufacture of thin film recording media.

It has been recognized that photochemical reactions in lubricant thin films formed on substrate surfaces may be initiated by UV irradiation to promote strong chemical-type bonding therebetween, as, for example, in the case of perfluoropolyether-based lubricant thin films formed on carbon (C)-containing protective overcoat layers of thin film magnetic and/or magneto-optical (MO) recording media. As determined by G. H. Vurens, et al. (*IEEE Trans. Magnetics*, 29 (1), 282 (1993)), when the energies of the incident UV photons exceed the work function of the C-based overcoat layer (i.e., ~5 eV), outer orbital electrons are ejected therefrom, whereby chain reactions are initiated in the overlying lubricant thin film, typically comprised of a derivatized perfluoropolyether comprising functional groups or moieties or a composite comprised of a perfluoropolyether and a lubricant additive including functional groups or moieties, e.g., a phosphazene such as X-1P. Disadvantageously, however, higher energy UV photons initiate certain chemical reactions which are harmful to the lubricant thin films, such as, for example, ozone ($O_3$) generation, degradation of the lubricant skeleton or backbone, e.g., fragmentation of the carbon chain of perfluoropolyether-based lubricants, and uncontrolled cross-linking of the lubricant molecules.

One method for avoiding, or at least alleviating, the above-described disadvantageous effects which may occur upon irradiation of lubricant thin films with high photon energy UV radiation, is to utilize relatively longer wavelength, thus lower energy, UV sources, e.g., $\geq 248$ nm, for curing of lubricant thin films. However, since the photon energies at such longer wavelengths are insufficient for photoelectron emission/generation in the C-based overcoat layer (as described supra), the present inventors have determined that functional groups or moieties must be present in the thin film lubricant which are capable of absorbing the lower energy photons for initiation of chemical reactions for effecting curing thereof. According to the present invention, the UV-absorbing functional groups or moieties may be present in the lubricant film either in the form of a derivatized perfluoropolyether compound, or in the form of molecules of a lubricant additive, e.g., a phosphazene such as bis (4-fluorophenoxy)-tetrakis (3-trifluoromethyl phenoxy) cyclo-triphosphazene (X-1P), and the wavelength of the UV radiation utilized for performing the curing treatment of the lubricant thin film is matched to the wavelength of an absorption peak of the derivatized perfluoropolyether compound or the lubricant additive in the UV region of the electromagnetic spectrum. The principles of the invention may be more fully realized by reference to the following illustrative, but non-limitative example.

EXAMPLE

X-1P, i.e., bis (4-fluorophenoxy)-tetrakis (3-trifluoromethyl phenoxy) cyclo-triphosphazene, has an absorption peak in the UV region at about 254 nm. According to the invention, therefore, irradiation of a composite lubricant thin film comprised of a Z-DOL PFPE containing X-1P for effecting curing thereof is performed with a wavelength-matched UV source emitting at 254 nm. While not wishing to be bound by any particular reaction mechanism, it is nonetheless believed that irradiation with wavelength-matched UV radiation at 254 nm can initiate the following photochemical fragmentation reaction:

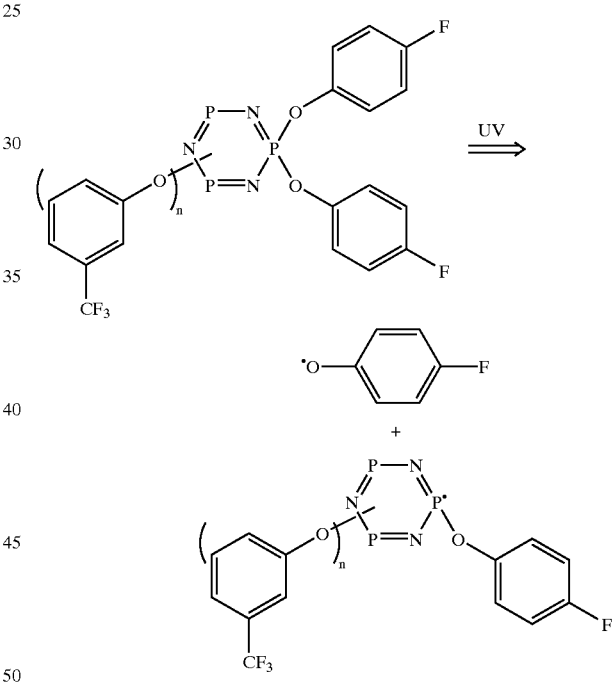

wherein the UV photon energy at 254 nm is efficiently absorbed by the X-1P to excite, and then cleave, the O—P bond between the fluorophenol or tri-fluoromethylphenol substituents of the cyclotriphosphazene ring, resulting in the formation of a pair of free radicals. It is further believed that the thus-formed, highly reactive free radicals then initiate further chemical reactions in the lubricant thin film, resulting in stronger chemical bonding of the latter to the C-containing overcoat layer. The surface energy, hence chemical reactivity, of the resultant UV-cured lubricant thin film is observed to be reduced, relative to uncured lubricant thin films and conventional UV-cured films, as manifested by a significant increase in the water contact angle (WCA) to about 90° or greater (e.g., above about 100°), which increase in WCA is indicative of a substantial reduction in surface tension.

According to the invention, in order to obtain optimal efficiency of UV curing, the wavelength(s) provided by the UV source should be well matched to the peak UV absorption wavelength(s) of the functional group(s) of the lubricant thin film in order to effect significant change (i.e., enhancement) of the chemical and/or physical properties thereof. By way of illustration only, X-1P exhibits a peak UV absorption at about 254 nm (at 25° C.), and irradiation of a composite Z-DOL PFPE/X-1P lubricant thin film with 254 nm UV radiation for effecting curing thereof results in a substantial increase in the water contact angle (WCA). By contrast, irradiation of composite Z-DOL PFPE/X-1P lubricant thin films with either 248 or 266 nm UV radiation wavelength fails to effect curing, as evidenced by substantially unchanged WCAs, even when irradiated with excess dosage UV.

Increasing the temperature of the lubricant thin films can result in a shift of the wavelength of the UV absorption peak, relative to the absorption peak at room temperature, e.g., 25° C. Such thermally-induced shift in peak UV absorption wavelength may be used to advantage. For example, the efficiency of the UV curing process according to the invention may be optimized by controlling the temperature of the lubricant thin film during UV irradiation, such that the wavelength of the UV absorption peak is shifted to be substantially matched to the wavelength of the UV radiation source.

Referring to FIG. 1, shown therein is a graph illustrating the variation of the water contact angle (WCA) of PFPE/X-1P composite lubricant thin films with irradiation time by a 266 nm UV laser beam at film temperatures of 25 and 80° C. As is clearly evident from the graph, the WCA of a PFPE/X-1P composite lubricant thin film is substantially unaffected by irradiation with a 266 nm YAG laser UV beam when the film is at room temperature (25° C.) during the irradiation, and the 254 nm wavelength of the UV absorption peak is not matched to the 266 nm wavelength of the UV laser beam. By contrast, when the PFPE/X-1P composite lubricant thin film is irradiated with a beam of 266 nm UV radiation from the YAG laser and the film is maintained at an elevated temperature (80° C.) at which the wavelength of the UV absorption peak thereof is shifted to about 266 nm to substantially coincide with the wavelength of the UV laser beam, the WCA of the film rapidly increases from an initial value of ~70° to above about 90°, reaching an ultimate WCA above about 100°, i.e., about ~103°. The high ultimate value of the WCA afforded by the invention reflects a significant reduction in the surface tension (i.e., surface energy) of the lubricant thin film, hence improved stability against chemical reaction, corrosion, etc.

Figure 2:
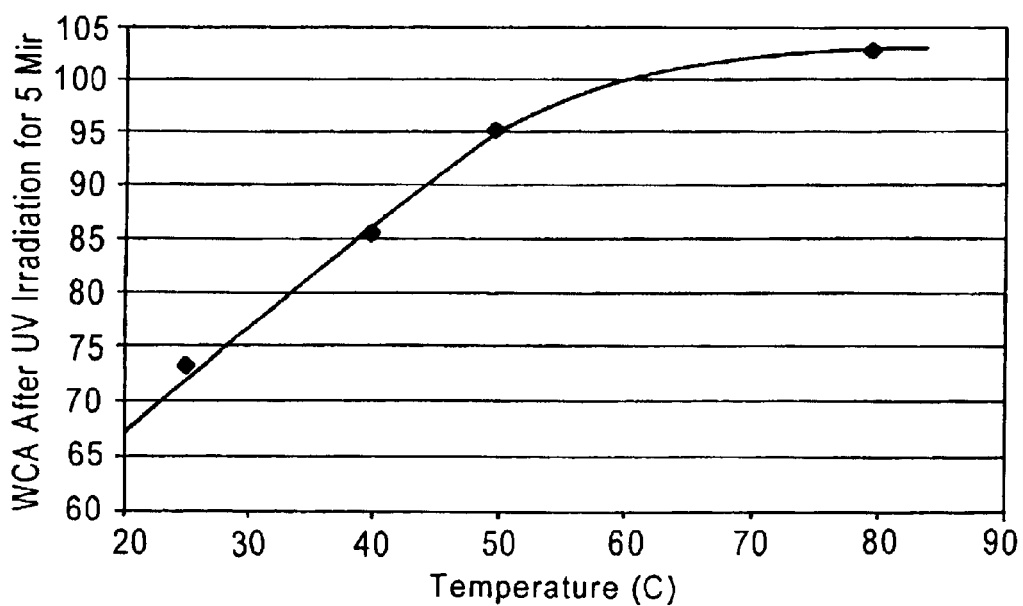
FIG. 2 is a graph for illustrating the variation of the water contact angle (WCA) of PFPE/X-1P lubricant thin films with film temperature upon irradiation by a 266 nm UV laser beam for 5 minutes.

Adverting to FIG. 2, shown therein is a graph illustrating the variation of the water contact angle (WCA) of PFPE/X-1P composite lubricant thin films with film temperature, upon irradiation by a 266 nm UV laser beam for a fixed interval, i.e., 5 minutes. As is apparent from the graph, the closer the temperature of the composite lubricant thin films during UV irradiation approaches the ultimate film temperature of 80° C. at which the wavelength of the UV absorption peak of the films substantially coincides (i.e., matches) with the wavelength of the UV irradiation source, the greater the WCA (which WCA again reaches an ultimate value of ~103° at 80° C.).

The results shown in the graphs of FIGS. 1 and 2, wherein UV curing of the PFPE/X-1P composite lubricant thin films is substantially complete within about 5 min. irradiation time, clearly demonstrate the capability of the inventive methodology to provide UV curing of lubricant thin films at increased efficiencies.

The present invention thus provides a number of advantages over conventional methodology utilizing UV irradiation for curing of lubricant thin films, e.g., perfluoropolyether-based lubricant films, utilized in the manufacture and use of disk-shaped, thin film magnetic and/or MO recording media, and is of particular utility in automated manufacturing processing of thin film magnetic and MO recording media requiring reliable, cost-effective formation of stable and durable lubricant topcoat layers for obtaining improved tribological properties. Specifically, the present invention provides for significantly increased water contact angles, hence increased chemical stability and resistance of the lubricant topcoat layer to chemically and mechanically induced decomposition and/or degradation, compared to conventional UV-cured perfluoropolyether-based lubricant thin films. Further, the inventive methodology can be readily practiced and utilized as part of conventional recording media manufacturing technology in view of its fill compatibility with all other aspects of automated manufacture of disk-shaped magnetic and MO media. Finally, the inventive methodology is broadly applicable to the manufacture of a number of different products, e.g., mechanical parts, gears, linkages, etc., requiring lubrication.

In the previous description, numerous specific details are set forth, such as specific materials, structures, processes, etc., in order to provide a better understanding of the present invention. However, the present invention can be practiced without resorting to the details specifically set forth. In other instances, well-known processing materials, structures, and techniques have not been described in detail in order not to unnecessarily obscure the present invention.

Only the preferred embodiments of the present invention and but a few examples of its versatility are shown and described in the present invention. It is to be understood that the present invention is capable of use in various other embodiments and is susceptible of changes and/or modifications within the scope of the inventive concept as expressed herein.

What is claimed is:

1. A method of increasing the efficiency of curing of a lubricant thin film by means of ultra-violet (UV) irradiation, comprising irradiating said lubricant thin film with UV radiation of a wavelength corresponding to a wavelength of maximum absorption of UV radiation by said lubricant thin film, wherein said lubricant thin film comprises at least one perfluoropolyether compound and a phosphazene derivative.

2. The method as in claim 1, wherein said lubricant thin film is formed on a surface of a data/information storage and retrieval medium.

3. The method as in claim 2, wherein said data/information storage and retrieval medium is a disk-shaped magnetic or magneto-optical (MO) recording medium.

4. The method as in claim 3, wherein said medium comprises a layer stack formed on a substrate surface, said layer stack including an uppermost, carbon (C)-containing protective overcoat layer, and said lubricant thin film is in the form of a topcoat layer in overlying contact with said carbon (C)-containing protective overcoat layer.

5. The method as in claim 1, wherein said phosphazene derivative is bis (4-fluorophenoxy)-tetrakis (3-trifluoromethyl phenoxy) cyclo-triphosphazene.

6. The method as in claim 1, further comprising varying said wavelength of maximum absorption of UV radiation by said lubricant thin film by varying the temperature of said lubricant thin film during said irradiation.

7. A method of manufacturing a data/information storage and retrieval medium, comprising steps of:

(a) providing a data/information storage and retrieval medium including at least one surface;

(b) applying a composite lubricant thin film including at least one perfluoropolyether compound and at least one phosphazene derivative as a lubricant additive to said at least one surface of said medium; and (c) curing said thin film of lubricant by irradiating with ultra-violet (UV) radiation of a wavelength corresponding to a wavelength of maximum absorption of UV radiation by said lubricant thin film.

8. The method as in claim 7, wherein:

step (a) comprises providing a disk-shaped magnetic or magneto-optical (MO) recording medium including a layer stack formed on a substrate surface, said layer stack including an uppermost, carbon (C)-containing protective overcoat layer; and step (b) comprises applying said lubricant thin film in the form of a topcoat layer in overlying contact with said carbon (C)-containing protective overcoat layer.

9. The method as in claim 7, wherein:

step (b) comprises applying a composite lubricant thin film including at least one perfluoropolyether compound and bis (4-fluorophenoxy)-tetrakis (3-trifluoromethyl phenoxy) cyclo-triphosphazene as said at least one lubricant additive; and step (c) comprises irradiating said composite lubricant thin film with UV radiation of 254 nm wavelength while maintaining the temperature of said composite lubricant thin film at a temperature of about 25° C.

10. The method as in claim 7, wherein:

step (c) further comprises varying said wavelength of maximum absorption of UV radiation by said lubricant thin film by varying the temperature of said lubricant thin film during said irradiation.

* * * * *